United States Patent [19]

Kougami et al.

[11] Patent Number: 4,521,816
[45] Date of Patent: Jun. 4, 1985

[54] MAGNETIC RECORDING METHOD FOR DIGITAL SIGNAL

[75] Inventors: Akihiko Kougami, Kokubunji; Seiichi Mita, Hachioji; Toru Kirino, Kodaira; Shusaku Nagahara, Hachioji, all of Japan

[73] Assignee: Hitachi Denshi Kabushiki Kaisha, Tokyo, Japan

[21] Appl. No.: 405,342

[22] Filed: Aug. 5, 1982

[30] Foreign Application Priority Data

Aug. 17, 1981 [JP] Japan .................... 56-127780

[51] Int. Cl.³ .................................... G11B 5/09
[52] U.S. Cl. ............................. 360/45; 360/46
[58] Field of Search .................. 360/40, 45, 46

[56] References Cited

U.S. PATENT DOCUMENTS

| | | | |
|---|---|---|---|
| 3,503,059 | 3/1970 | Ambrico | 360/45 |
| 3,618,119 | 11/1971 | Rodriguez | 360/46 |
| 3,665,485 | 5/1972 | Pear, Jr. | 360/45 |
| 4,167,761 | 9/1979 | Best | 360/45 |

Primary Examiner—Vincent P. Canney
Attorney, Agent, or Firm—Antonelli, Terry & Wands

[57] ABSTRACT

A magnetic recording method for digital signals, and more particularly to a magnetic head driving current waveform wherein digital signals to be recorded on a magnetic tape at a high density have the waveform of the head driving current shaped in order to reduce the degradation of the waveform. That is, in a case where the period of the current reversal of the driving current is long and continues for at least 1.5 times the bit period, the amplitude of the current in the rise part of the wave is made small. The driving current of this waveform has a reduced waveform degradation, and the magnetic recording at the high density becomes possible.

6 Claims, 73 Drawing Figures (a) RECORDING SIGNAL (b) RECORDING CURRENT (c) PLAY BACK SIGNAL (a) RECORDING SIGNAL (b) PLAY BACK SIGNAL (c) EQUIVALENT PLAY BACK SIGNAL FIG. 3
PRIOR ART
(a)
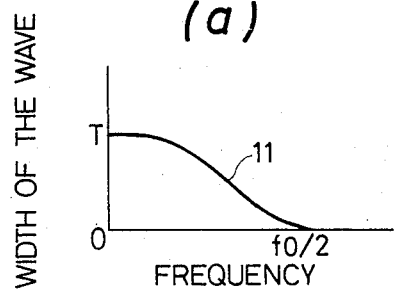
(b)
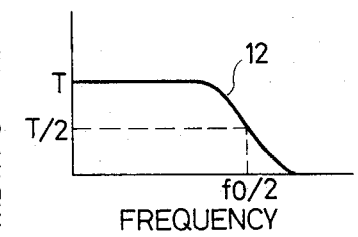
FIG. 4
PRIOR ART
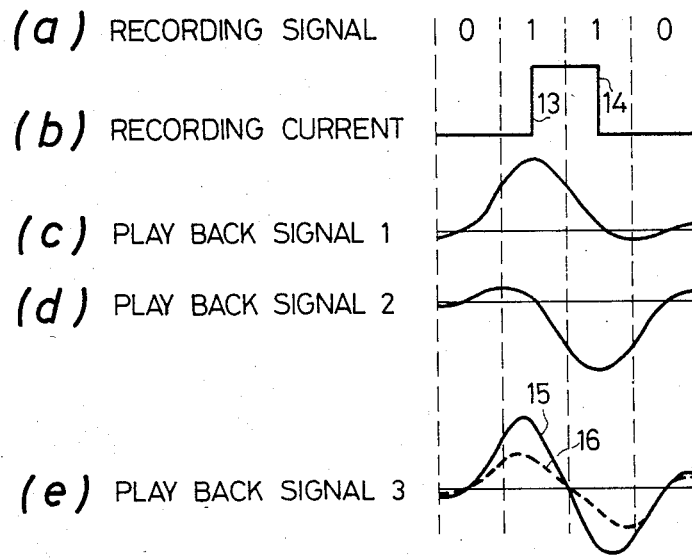
(a) RECORDING SIGNAL
(b) RECORDING CURRENT
(c) PLAY BACK SIGNAL 1
(d) PLAY BACK SIGNAL 2
(e) PLAY BACK SIGNAL 3

FIG. 5
PRIOR ART
(a) RECORDING SIGNAL
(b) RECORDING CURRENT
(c) EQUIVALENT PLAY BACK SIGNAL
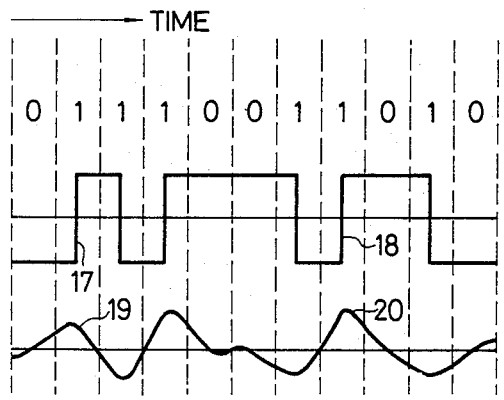
(d) EYE PATTERN 1
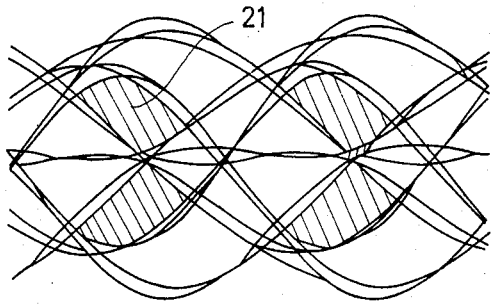
(e) EYE PATTERN 2
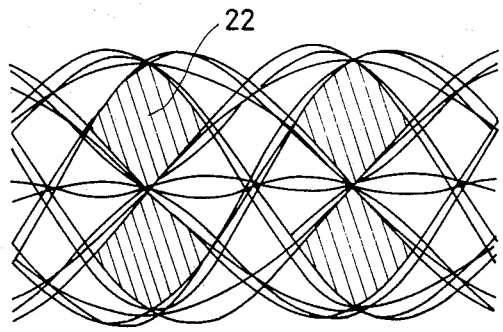

(a) RECORDING SIGNAL (b) RECORDING CURRENT (a) RECORDING SIGNAL (b) RECORDING CURRENT (c) PLAY BACK SIGNAL (a) RECORDING SIGNAL (b) RECORDING CURRENT (c) MAGNETIC PATTERN (d) PLAY BACK SIGNAL (a) RECORDING SIGNAL (b) N R Z (c) NRZ IN THE PRESENT INVENTION (d) M F M (e) MFM IN THE PRESENT INVENTION (f) $M^2$ (g) $M^2$ IN THE PRESENT INVENTION (a) RECORDING SIGNAL (b) RECORDING CURRENT

MAGNETIC RECORDING METHOD FOR DIGITAL SIGNAL

BACKGROUND OF THE INVENTION

The present invention relates to a magnetic recording method for a digital signal, and more particularly to the improvement of a magnetic head driving current waveform.

In a magnetic recording method for a digital signal which utilizes a magnetic medium such as magnetic tape and magnetic disk, recording is effected in such a way that a magnetic head is driven by current corresponding to recording information of "1" or "0" given in a time sequence, so as to form a magentic pattern on the magnetic medium. The correspondence between the information of the digital signal and the driving or recording current is called the recording system, and there are recording systems such as the NRZ, NRZI, MFM and, $M^2$ system.

In general, in prior-art methods of recording digital signals, a rectangular wave is used as the magnetic head driving current for any of these recording systems. By way of example, FIGS. 1(a), 1(b) and 1(c) refer to the NRZI recording system and show recording information of (010), a driving current waveform and a playback signal waveform at the time when a magnetic pattern is read out, respectively. It is well known that the playback signal becomes a mountain-like pulse waveform with respect to one reversal of the driving current.

In a magnetic disk device, magnetic tape device, etc. for recording and playing back digital signals, in order to restore the playback signal to a signal corresponding to the original recording information, there is used a playback method which compares the level of the playback signal with reference to an amplitude detection level VTH indicated at numeral 6 in FIG. 1(c). This is called the amplitude detection. The time interval of a bit as indicated by letter T in FIG. 1(a) is termed the bit period, and the level comparisons are made at the centers of the bit periods T as indicated at numerals 1, 2 and 3 in FIG. 1(b).

In this regard, when the line recording density of the recording medium becomes high, usually the playback pulse waveform corresponding to one reversal of the recording current becomes a waveform spreading wider than the bit period, and the amplitude of the playback signal does not become zero at the centers of the adjacent information bits of "0", as shown at numerals 4 and 5 in FIG. 1(c). This phenomenon is called the intersymbol interference, and when it has increased, a large number of symbol errors develop in the amplitude detection.

In the magnetic recording device etc. for recording and playing back the digital signals, therefore, a circuit for compensating the waveform after the playback is provided so as to equalize the playback waveform. FIG. 2(c) illustrates the waveform compensation based on the equalization. FIGS. 2(a) and 2(b) show a recording information signal and a playback signal, respectively. One playback pulse waveform is equalized so that the amplitudes of the points 7 and 8 of the adjacent bit periods may become zero as indicated at numerals 9 and 10. Such equalized waveform is called the Nyquist waveform. When the operation of the equalization is discussed from consideration of the frequency characteristic, the equalization serves to make the frequency characteristic of the playback pulse waveform the Nyquist frequency characteristic. This will be explained with reference to FIGS. 3(a) and 3(b). The frequency characteristic of one spreading playback pulse is such that, as indicated at numeral 11 in FIG. 3(a), a higher frequency component is smaller in amplitude than a lower frequency component. This frequency characteristic is compensated so as to become a frequency characteristic 12 in FIG. 3(b) as indicated by:

$A$ when $|f| \leq (1 - b)f_o/2$, $$\frac{A}{2}\left(1 - \sin\frac{1}{bf_o}\{|f| - f_o/2\}\right)$$

when $||f| - f_o/2| \leq bf_o/2$,
0 when $|f| \geq (1 + b)f_o/2$, and phase delay magnitude being constant, when $|f| \leq (1+b)f_o/2$ This frequency characteristic is called the Nyquist frequency characteristic, and a waveform on a time axis corresponding thereto is the Nyquist waveform. Here, f denotes the frequency, A the amplitude, b ($0 \leq b \leq 1$) the roll-off, and $f_o/2$ the Nyquist frequency.

Such an equalizing method has been performed in the so-called linear transmission channels of a telephone channel etc., and the linear intersymbol interference (4 and 5 in FIG. 1(c)) thus far described can be perfectly eliminated by carrying out the equalization.

In a transmission channel for magnetic recording and playback, however, nonlinear intersymbol interference due to the interaction between bits occurs besides the linear intersymbol interference which can be compensated by the playback equalizer circuit. This will be explained with reference to FIGS. 4(a)–4(e).

FIGS. 4(a) to 4(e) show recording information of "0110", a recording current and equalized playback signals by taking the NRZI recording system as an example. An equalized playback signal 1 is obtained in correspondence with only the reversal 13 of the recording current, while an equalized playback signal 2 is obtained in correspondence with only the reversal 14 of the recording current. A waveform obtained by superposing the playback signal 1 and the playback signal 2 ought to become as shown at numeral 15 in FIG. 4(e). In actuality, however, when the pattern is recorded and then played back and equalized, a distorted waveform deviating from the superposed waveform develops as shown at numeral 16 in FIG. 4(e). Such distortion comes from nonlinearity peculiar to the magnetic recording, and is ascribable to the fact that the interaction between bits takes place due to recording demagnetization in the recording process or a demagnetizing field appearing from the recording medium. In addition, the nonlinear distortion differs in size in dependence on recording patterns and has the property of becoming greater with the line recording density of the recording medium.

In the presence of such nonlinear distortion, the amplitude of the playback pulse signal becomes different every recording pattern which is the combination of "1" and "0", and symbol errors develop frequently in the amplitude detection. Accordingly, making the amplitude of the playback pulse signal constant irrespective of the recording patterns is very important for reducing the symbol errors at the playback.

In order to evaluate the nonlinear distortion, an eye pattern is used. It is displayed by superposing equalized playback signals arrayed in a time sequence, at respective bit periods. It is exemplified in FIGS. 5(a)–5(e).

FIGS. 5(a) to 5(e) show a recording information, a recording current, equalized playback signals and eye patterns by taking the NRZI recording system as an example. The reversals 17 and 18 of the recording current in FIG. 5(b) are the same reversals of from a lower level to a higher level. Since, however, the respective adjacent recording current components differ as being "0" and "1", and "1" and "0", equalized playback signals come to have unequal amplitudes as respectively shown at numerals 19 and 20 in FIG. 5(c). Therefore, when the playback signals are displayed as the eye pattern, the eye portion of a hatched part 21 becomes small as shown by an eye pattern 1 in FIG. 5(d). In the amplitude detection, the level comparison is performed by setting the detection level VTH at the center of the eye. When this eye is small, a margin for the signal-to-noise ratio lessens, and symbol errors increase.

An eye pattern 2 in FIG. 5(e) is an equalized eye pattern synthesized by superposing one playback waveform, and shows a state free from the nonlinear distortion. When an eye is large as shown at numeral 22 in the figure, the signal-to-noise ratio has a wide margin, and there are few symbol errors in the amplitude detection.

Accordingly, to bring the eye pattern 1 having the nonlinear distortion close to the eye pattern 2 is an indispensable condition in points of enhancing the reliability of playback signals and rendering the density high.

As a measure for removing the distortion of the playback signal in such magnetic recording and playback, there have heretofore been proposed methods in which additional current reversal points are provided as shown in FIGS. 6(a) and 6(b) and FIGS. 7(a) to 7(c) (Japanese Patent Application Publication No. 55-40921). Referring to FIGS. 7(a) to 7(c), as regards recording information in FIG. 7(a), playback waveforms which are obtained in correspondence with the reversals 23, 24 and 25 of a recording current in FIG. 7(b) are as shown at 23', 24' and 25' in FIG. 7(c), respectively, and a playback pulse signal is narrowed on the basis of a waveform (23'+24'+25') obtained as the sum of the aforementioned playback waveforms.

By narrowing the playback pulse signal, these methods exhibit some effects for reducing the distortions of the playback waveforms attributed to the linear intersymbol interference shown at 4 and 5 in FIG. 1(c) and the nonlinear intersymbol interference shown at 16 in FIG. 4(e). These methods, however, relieve the interaction between bits by taking note of only the reversal of one recording current and provide for the spreading of one bit thereof and do not take into account the differences of the nonlinear distortions dependent upon the recording patterns, and the differences being the peculiar property of the magnetic recording and playback. Moreover, on account of the property that the transmission channel of the magnetic recording and playback cuts off shorter wavelength components as the line recording density of the recording medium becomes higher, there is the disadvantage that the effect owing to the additional current reversal points 24 and 25 in FIG. 7(b) lowers.

SUMMARY OF THE INVENTION

In view of the above, the present invention has for its object to make the eye of the eye pattern of equalized playback signals large by varying the reversal amplitude of a head driving current in accordance with recording patterns, thereby to make nonlinear distortions constant irrespective of recording patterns and to make the amplitudes of playback signal pulses constant.

The present invention consists in that in a case where in a magnetic head driving current, its polarity continues for at least 1.5 times of a bit period, the current reversal amplitude of a current reversal point at which the polarity is started is made small relative to the other current reversal amplitude, thereby to make the amplitudes of playback signal pulses constant irrespective of recording patterns and to make the eye of an eye pattern large. Here, the expression "at least 1.5 times of a bit period" signifies "at least 2 times of the bit period" in recording systems, such as NRZ and NRZI, wherein the time interval at which the current reversal occurs is an integral number of times of the bit period, and it signifies "at least 1.5 times of the bit period" in recording systems, such as MFM and M$^2$, wherein the time interval at which the current reversal occurs becomes 1 time, 1.5 times, 2 times . . . of the bit period".

BRIEF DESCRIPTION OF THE DRAWINGS

FIG. 1(a) through FIG. 7(c) concern prior arts, in which

FIGS. 1(a) to 1(c) are diagrams showing the correspondence of recording information, a recording current and a playback signal;

FIGS. 2(a) to 2(c) and FIGS. 3(a) and 3(b) are diagrams for explaining equalization;

FIGS. 4(a) to 4(e) are diagrams for explaining the nonlinear distortion of a playback waveform;

FIGS. 5(a) to 5(e) are diagrams for explaining an eye pattern; and

FIGS. 6(a) and 6(b) and FIGS. 7(a) to 7(c) are diagrams showing prior-art methods of suppressing the distortions of playback waveforms; and FIG. 8(a) through FIG. 18(q) concern the present invention, in which FIGS. 8(a) to 8(d) and FIG. 9 are diagrams for explaining a cause for the occurrence of a nonlinear distortion;

FIGS. 10(a) to 10(d) are diagrams for explaining the principle of the present invention;

FIGS. 11(a) to 11(c) are diagrams showing a recording current waveform at the time when the present invention is applied to the NRZI recording system;

FIGS. 12(a) to 12(e) are diagrams showing recording current waveforms at the time when the present invention is applied to prior-art methods of suppressing playback waveform distortions;

FIGS. 13(a) to 13(g) are diagrams showing recording current waveforms at the time when the present invention is applied to the NRZ, MFM and M$^2$ recording system;

FIGS. 14(A) and 14(B), FIGS. 15(A) and 15(B) and FIGS. 16(A) and 16(B) are diagrams showing the effects of the present invention;

FIG. 17 is a circuit diagram for realizing the present invention with the NRZ recording system; and FIGS. 18(a) to 18(q) are time charts for explaining the operations of the circuit in FIG. 17.

DETAILED DESCRIPTION OF THE PREFERRED EMBODIMENTS OF THE INVENTION

Hereunder, the present invention will be described with reference to the drawings. First of all, the cause for which the magnitudes of nonlinear distortions differ depending upon recording patterns will be explained with reference to FIGS. 8(a) to 8(d) and FIG. 9.

FIGS. 8(a), 8(b), 8(c) and 8(d) show recording information of "01110", a recording current waveform in a prior art, a magnetic pattern on a medium, and a playback signal by taking the recording system NRZI as an example, respectively.

Figure 1:
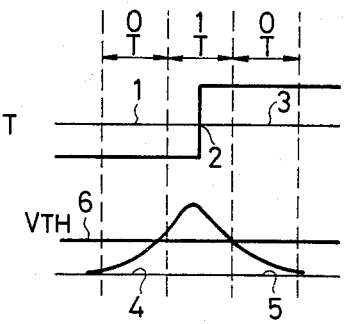
Figure 2:
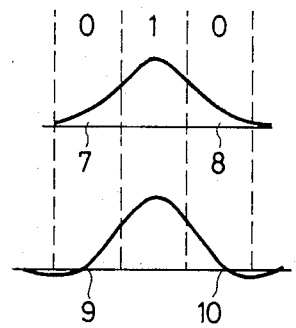
Figure 6:
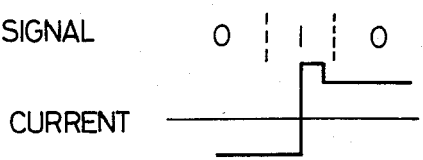
Figure 7:
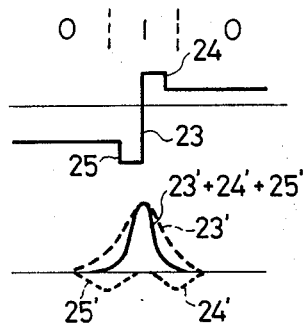
Figure 8:
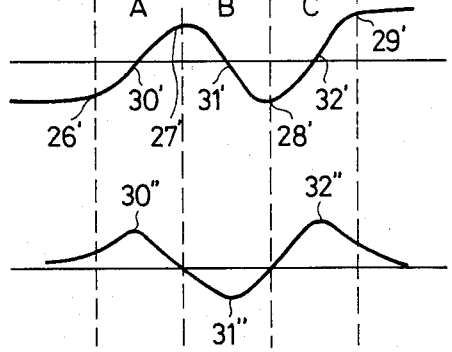

Here, the combination of "0" and "1" in the recording information of FIG. 8(a) shall be called the recording pattern. Letter A, B or C in FIG. 8(b) indicates a change of the recording current from a low level to a high level or vice versa. The change shall be called the current reversal point, and the magnitude $I_o$ of the change shall be called the current reversal amplitude. In addition, the high level or low level of the recording current shall be called the polarity of the current.

After the recording pattern of "01110" in FIG. 8(a) has been recorded, the magnetic pattern which corresponds to the recording current waveform in FIG. 8(b) is formed on the medium. Even though the magnitudes of magnetization on the medium at 26', 27', 28' and 29' in FIG. 8(c) correspond to equal levels of the recording current, they become respectively different values on account of nonlinear interactions which occur in the writing operations of the respective bits. The interaction is considered to be caused by both a recording demagnetization action in the magnetizing process and a demagnetization action due to a demagnetizing field arising from the magnetization of the medium.

The recording demagnetization will be first explained by considering the hysteresis of the formation of the magnetized part 26' in FIG. 8(c). When a magnetic head lies at the point 26' of the medium, the magnetization is written in a minus value by a minus intense head field. Next, when the head lies at a point 30' of the medium, a plus field is applied to the point 30' of the medium so as to write plus magnetization. Since, however, the head field has a spacial spread, the plus field acts on the point 26' of the medium in the plus writing operation of the point 30' and functions to demagnetize the original minus magnetization of the point 26'. This is termed the recording demagnetization. In the subsequent writing operations of the points 28' and 29' in the figure, the magnetic head is far distant from the point 26' of the medium, so that the magnetization of the point 26' is not considerably affected. It is accordingly understood that the influence of the recording demagnetization depends most intensely upon the current polarity of the adjacent part. Now, the recording demagnetization of the points 27' and 29' in FIG. 8(c) will be considered. Both the adjacent points of the point 27' have the low level written, whereas as to the point 29', only the point 28' has the low level written and the bit next the point 29' has the same high level written. Therefore, the actions of recording demagnetization which the points 27' and 29' undergo become different. Accordingly, the magnitudes of magnetization of the points 27' and 29' after the end of the recording become unequal in spite of the equal levels of the recording current.

In the next place, the demagnetizing field which causes the second demagnetizing action will be explained by considering the magnetizing process of the point 26' again.

The value of the magnetization of the part 30' changes in correspondence with the reversal 30 of the recording current, and a magnetic field arises from the magnetization change. This demagnetizing field acts in the direction of reducing the magnetization of the point 26'. Since the magnitude of the demagnetizing field is approximately in inverse proportion to the distance on the medium, the demagnetization of the point 26' attributed to such demagnetizing field is most affected by the magnetization change of the part 30' and is little affected by magnetization changes of parts 31' and 32'. Accordingly, the demagnetization action by the demagnetizing field is influenced most intensely by the adjacent recording pattern likewise to that by the recording demagnetization. Now, the demagnetization actions by the demagnetizing fields on the points 27' and 29' in FIG. 8(c) will be considered. In both the adjacent parts of the point 27', there are the magnetization changes of the parts 30' and 31', and demagnetizing fields which reduce the magnetization of the point 27' develop, whereas in adjacency to the point 29', there is only the magnetization change of the part 32', so that the magnitude of the demagnetizing field becomes different between the points 27' and 29'. Therefore, the magnitudes of magnetization to be finally decided are influenced by the demagnetizing fields and become unequal values as in the case of the recording demagnetization.

In the above, the nonlinear interaction in the recording process of the magnetic recording and playback has been described from the viewpoints of the demagnetization actions by the recording demagnetization and the demagnetizing field. The fact that the value of each magnetization is affected most intensely by a pattern to be recorded 1 bit later in time, will now be described with reference to FIG. 9.

Figure 9:
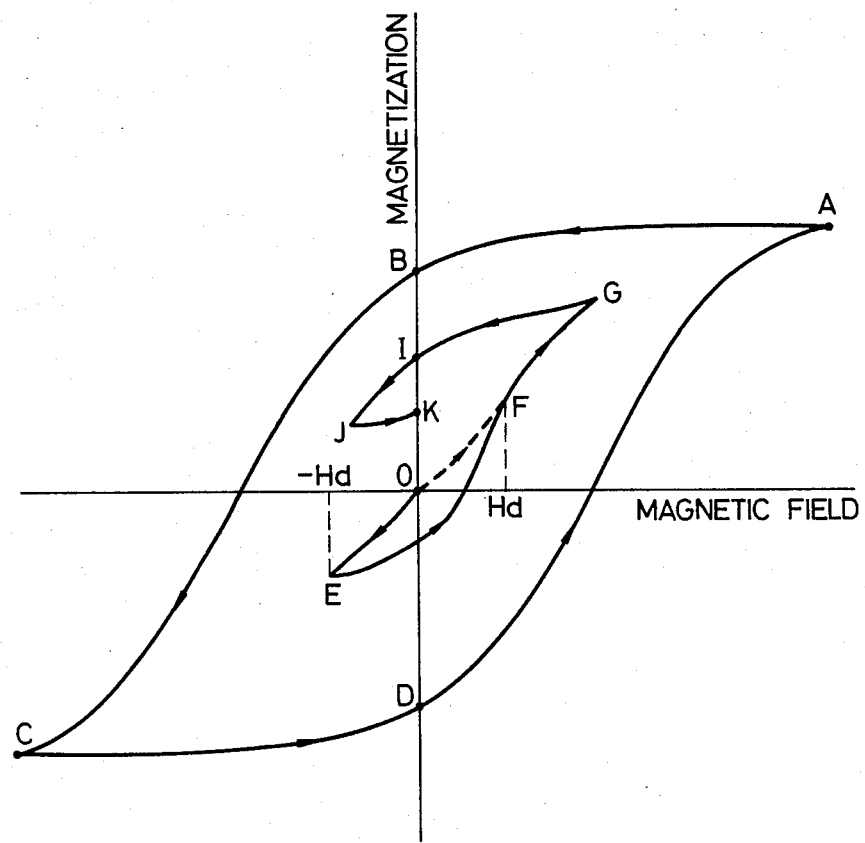

FIG. 9 shows the so-called hysteresis loop illustrative of the relationship between the magnetic field and the magnetization of a medium. A larger loop ABCDA on the outer side is termed the major loop, and a loop on the inner side the minor loop. The hysteresis of the magnetization of the point 27' in FIG. 8(c) will be described with reference to the hysteresis loop.

In a magnetic tape device etc. for recording and playing back digital signals, the medium is A.C.-demagnetized. Therefore, before the recording is performed, the magnetization of the point 27' in FIG. 8(c) is in the unmagnetized state and lies at a point 0 in FIG. 9. While the parts 26 and 30 in FIG. 8(b) are being recorded, a minus magnetic field is applied to the point 27' by both the demagnetization actions attributed to the recording demagnetization and the demagnetizing field. At this time, accordingly, the magnetization of the point 27' shifts from the point 0 to a point E in FIG. 9. Subsequently, a plus intense head field is applied during the writing of the point 27 in FIG. 8(b), and hence, the corresponding magnetization shifts from the point E to a point G on the hysteresis loop of FIG. 9.

Here, as the feature of the minor loop, when a magnetic field greater than the magnetic field Hd of a point F which is equal in magnitude to the minus magnetic field -Hd of the point E is applied, the hysteresis of 0→E→F is canceled, and the magnetization becomes quite the same as in a case where the hysteresis of 0→F (broken line in the figure) has been traced. This signifies that the influence of the demagnetization action during the writing of the parts 26 and 30 is cancelled by the writing of the point 27 in FIG. 8(b). That is, the influence of the preceding bits 26 and 30 is mostly canceled by the intense plus writing of the point 27.

In the next place, the magnetization of the point 27' is brought from the point G in FIG. 9 back to a point J of minus field by the writing of parts 31 and 28 in FIG. 8(b). The value of the magnetization of the point 27' is greatly affected by the magnitude of the aforementioned minus field, namely, a demagnetizing field attributed to the writing of the parts 31 and 28 in FIG. 8(b). As the head comes away from the point 27', the magnetization of the point 27' changes to finally become a value K in FIG. 9.

It has been indicated from the above that the value of the magnetization of the medium is influenced most intensely by the recording pattern which is 1 bit later in time. Here, the magnitudes of magnetization of the points 26', 27', 28' and 29' in FIG. 8(c) will be considered. Since the respectively succeeding bits of the points 26, 27 and 28 have the respectively opposite polarities of the recording current at the points 27, 28 and 29, the magnitudes of magnetization decrease due to the demagnetization of the recording demagnetization as well as the demagnetizing fields. The magnetization of the point 29', however, is little demagnetized because of the next bit being "0" and finally becomes greater than the values of magnetization of the points 26', 27' and 28' in FIG. 8(c) via the hysteresis of magnetization of 0→E→G→I in FIG. 9. The change of magnetization of the point 32' therefore becomes greater than those of the points 30' and 31', with the result that a playback signal 32" in FIG. 8(d) becomes larger in amplitude than playback signals 30" and 31".

That is, in the recording current waveform of the prior art, the playback signal of the current reversal which precedes by 1 bit to the recording information having no current reversal becomes larger in amplitude than the other playback signal.

It is very difficult to remove such dispersion of the amplitudes of the playback signals depending upon the recording patterns, even by the use of a playback equalizing circuit. When the playback signals are indicated as an eye pattern, the eye of the eye pattern becomes small, which forms a cause for incurring symbol errors in the amplitude detection.

There will be explained the principle of the present invention which, on the ground of the above-stated cause for the nonlinear distortions, makes the amplitudes of playback signals constant irrespective of recording patterns and makes eyes after equalization large.

The present invention consists in enlarging the recording current reversal amplitude of a bit subject to an intense demagnetizing action, thereby to make the magnitudes of magnetization on a medium constant irrespective of recording patterns and to make the amplitudes of playback signals constant. The bit subject to the intense demagnetizing action is a bit at which a recording current reverses and which precedes directly to a bit where the recording current reverses.

The present invention is expressed in other words as follows. In a case where the polarity of the recording current continues for at least 2 times of a bit period, a playback signal pulse, obtained when the current reversal at which the particular polarity begins is recorded and played back, becomes greater than the other playback pulses. Therefore, the amplitude of the particular current reversal is made small relative to those of the other current reversals, thereby to make the amplitudes of the playback signal pulses equal irrespective of the recording patterns.

The present invention will be concretely described by taking the NRZI recording system in FIGS. 10(a)-10(d) as an example. FIGS. 10(a), 10(b), 10(c) and 10(d) show a recording information signal, a recording current, a magnetic pattern and a playback signal, respectively.

In these figures, symbols 33, 33' and 33" indicate the prior-art system corresponding to FIGS. 8(a)-8(d), and symbols 34, 34' and 34" indicate the system of the present invention by which a current reversal amplitude Iv preceding directly to a bit where the recording current does not reverse is made small relative to the other current reversal amplitude Io.

Figure 10:
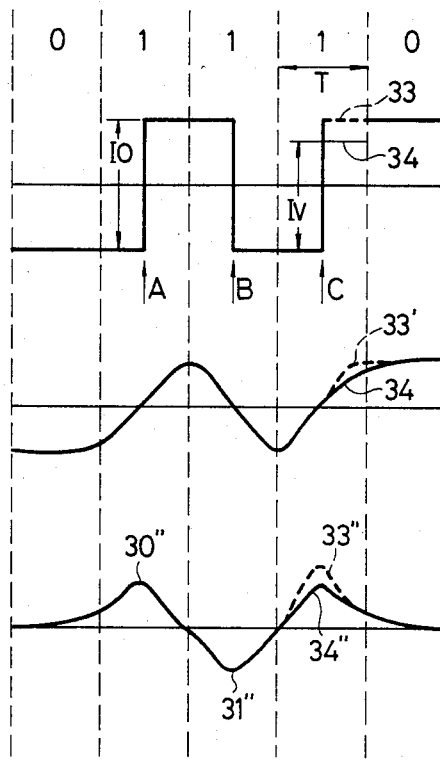

The current reversal amplitude of the part 34 in FIG. 10(b) is smaller than that of the part 33, with the results that the magnetization 34' of a medium has a smaller value than the magnetization 33'. Therefore, the change of the magnetization 34' becomes smaller than that of the magnetization 33', and the playback signal 34" becomes smaller than the playback signal 33" in the prior art and has the same amplitude value as the amplitudes 30" and 31" of the other playback signals.

In this manner, the current reversal amplitude Iv of the bit at which the recording current reverses and which precedes, in time, directly to the bit where the recording current does not reverse is made small relative to the other current reversal amplitude Io, whereby the amplitudes of the playback signals of all the patterns can be equalized as seen in FIG. 10(c).

Figure 11:
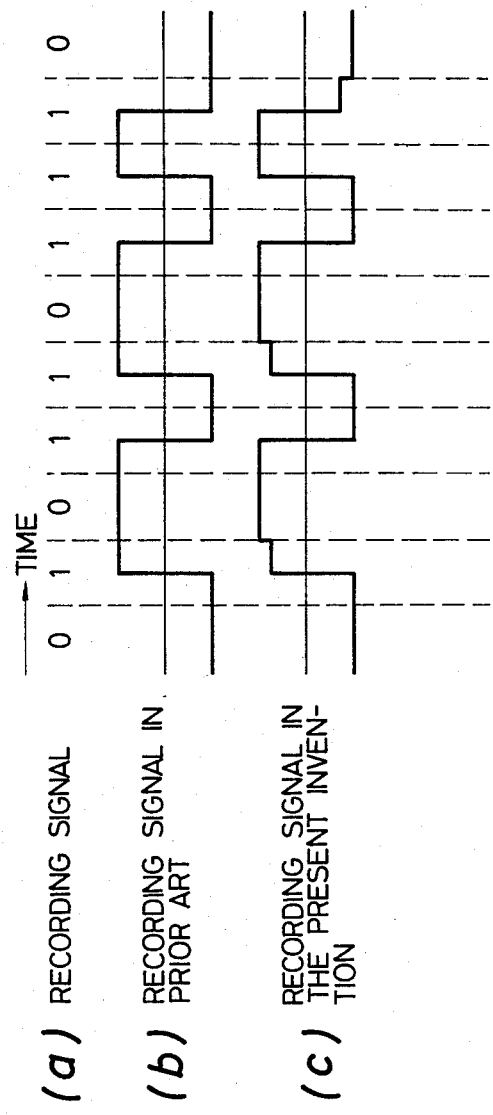

By taking the NRZI as an example, FIG. 11(a)-11(c) compare and illustrate a recording current waveform in the prior-art system (FIG. 11(b)) and a recording current waveform according to the present invention (FIG. 11(c), by the use of a recording pattern having a large number of bits. In this example, the current amplitude of bit "1" preceding directly to bit "0" is made small relative to the other current amplitude.

Figure 12:
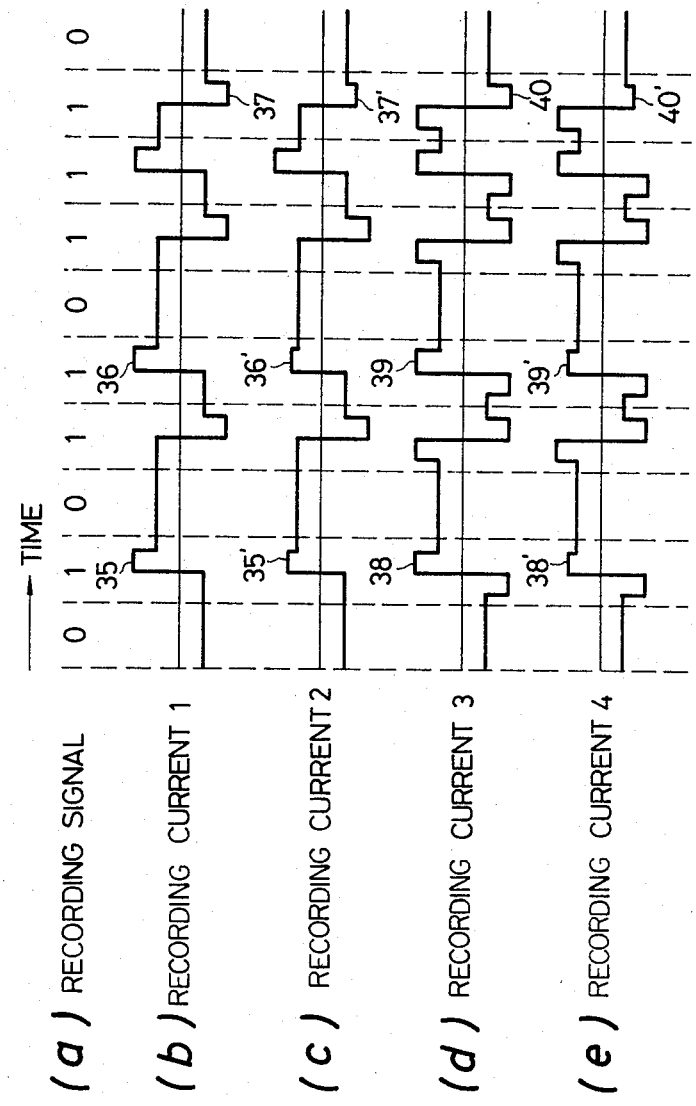

FIGS. 12(a)-12(e) illustrate an example in which the present invention is applied to recording current waveforms provided with additional current reversal points (refer to FIGS. 6(a) and 6(b) and FIGS. 7(a) to 7(c)). A recording current 1 in FIG. 12(b) corresponds to the prior-art system wherein one additional current reversal point is provided for one current reversal, while a recording current 2 in FIG. 12(c) is a current waveform at the time when the present invention is applied to the current waveform of the prior art. In this example, in the current reversal point preceding directly to a bit where the current does not reverse, the amplitude of the additional current reversal point thereof is made small relative to the other additional current reversal point, or no additional current reversal point is provided. (Refer to parts 35, 36 and 37 and 35', 36' and 37' in the figures.)

A recording current 3 in FIG. 12(d) is a current waveform of the prior-art system in which two additional current reversal points are provided for one current reversal. It is a recording current 4 in FIG. 12(e) that is obtained by applying the present invention to the current waveform of the prior art. In accordance with the rule of the present invention, additional current reversal points 38, 39 and 40 in FIG. 12(d) are made small as shown at 38', 39' and 40' in FIG. 12(e), or no additional current reversal point is provided.

Figure 13:
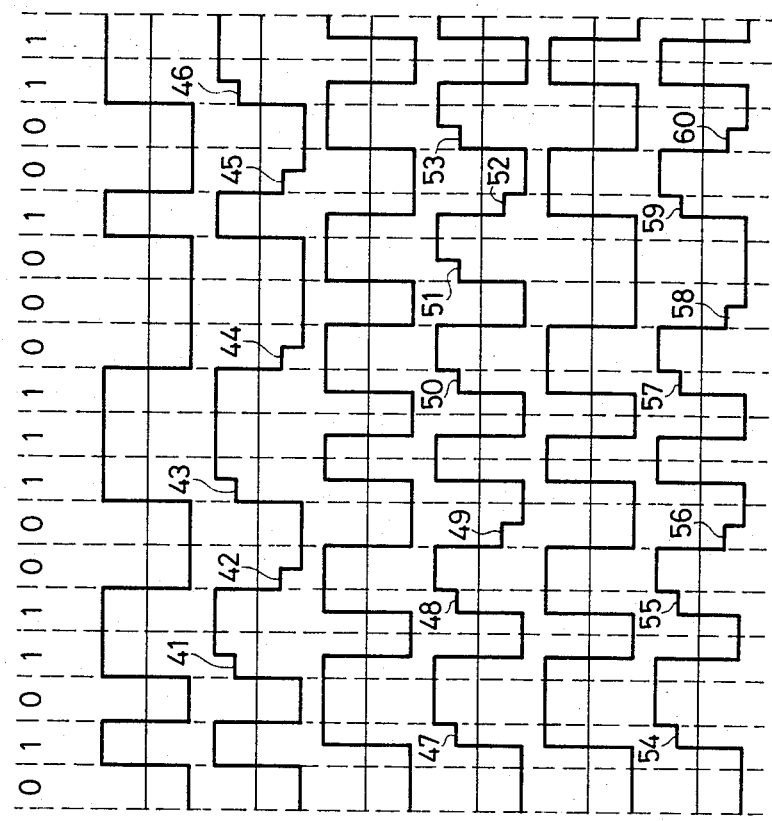

FIGS. 13(a)-13(g) show a recording current waveform in a prior art and recording current waveforms according to the present invention in the recording systems NRZ, MFM and M², with respect to recording information in FIG. 13(a).

In the NRZ recording system, as shown in FIG. 13(b), there are current reversals at the boundaries of the recording information. According to the present invention, in a case where the same polarity of the recording current continues for at least two bits, the amplitude of the leading or preceding recording current reversal is made small. (Refer to parts 41, 42, 43, 44, 45 and 46 in FIG. 13(c).)

In case of the MFM recording system, as shown in FIG. 13(d), the time intervals at which the recording current reverses become 1 times, 1.5 time, 2 times, ... of the bit period. As shown in FIG. 13(e), in a case where the polarity of the recording current continues for at least 1.5 times of the bit period, the amplitude of the leading current reversal is made smaller than the other current amplitude. (Refer to parts 47, 48, 49, 50, 51 and 52 in FIG. 13(e).)

In case of the M² recording system in FIG. 13(f), likewise to the MFM recording system, when the polarity of the recording current continues for at least 1.5 times of the bit period, the amplitude of the leading current reversal is made small. (Refer to parts 54, 55, 56, 57, 58, 59 and 60 in FIG. 13(g).)

In the examples in which the present invention is applied to the recording systems, that part of the recording current in which the amplitude is made small is illustrated as half of the bit period. Of course, it is covered in the present invention to make such part 1 bit period.

EXAMPLES

Hereunder, the present invention will be described in detail with reference to examples. The effect of the present invention will be elucidated in conjunction with FIGS. 14(A)–14(B), FIGS. 15(A)–15(B) and FIGS. 16(A)–16(B).

Figure 14:
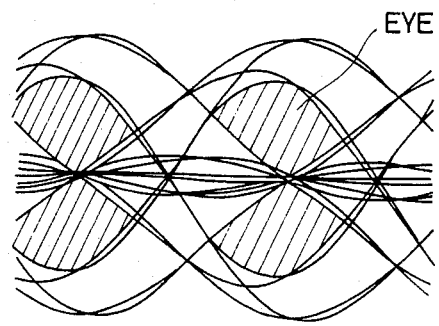
Figure 14:
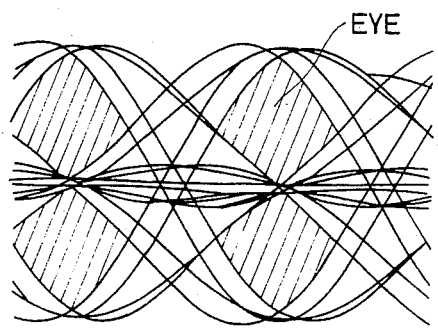

FIGS. 14(A) and 14(B) compare and illustrate the eye patterns of the prior-art system and the system according to the present invention by taking the NRZI recording system as an example. Here, the "eye opening" is defined in order to indicate the size of an eye quantitatively. The eye opening is defined as the value of $E_2/E_1$ where $E_1$ denotes the amplitude of the eye of the eye pattern obtained by the superposition of the 1-bit playback pulse signals as shown by the eye pattern 2 in FIG. 5(e), and $E_2$ denotes the amplitude of an eye obtained by recording and playing back a random pattern. In the example of FIGS. 14(A) and 14(B), the eye opening in the prior-art system is 60%, whereas the eye opening becomes 85% in the system according to the present invention, so that the improvement of the eye opening to the extent of 25% is observed.

Figure 15A:
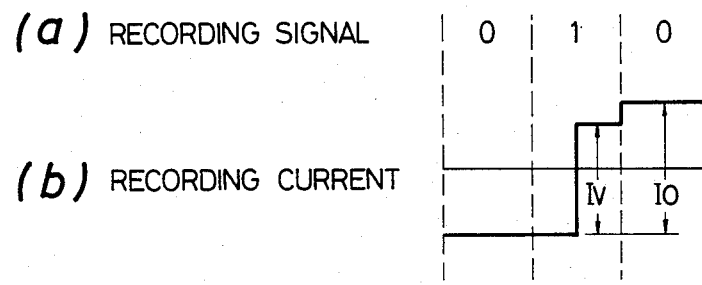
Figure 15B:
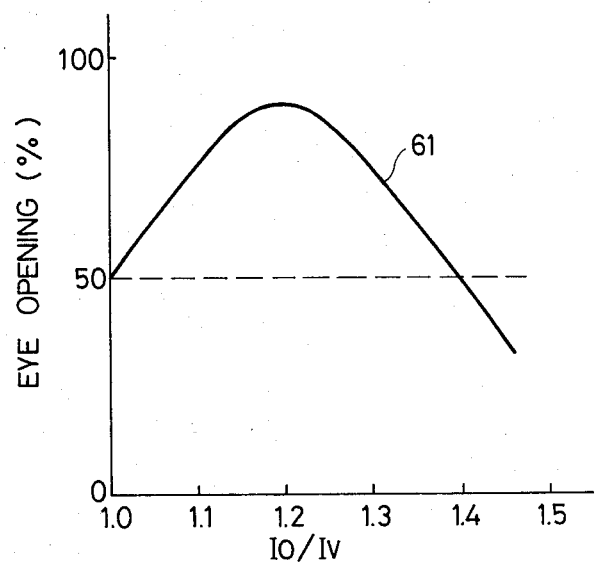

FIGS. 15(A) and 15(B) illustrate the variation of the eye opening at the time when the ratio Io/Iv of the current reversal amplitude of the present invention is changed. A case where Io/Iv is 1 (one) corresponds to the recording current waveform of the prior art, and the eye opening in that case is assumed to be 50% by way of example. Numeral 61 in FIG. 15(B) illustrates the eye opening at the time when Io/Iv is gradually increased. From this figure, it is understood that the effect of the present invention appears when $1 < Io/Iv < 1.4$.

Figure 16:
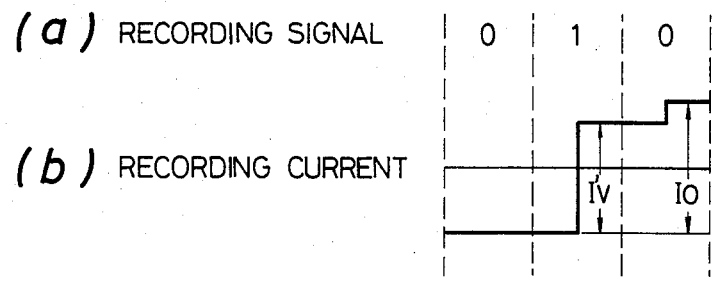
Figure 16:
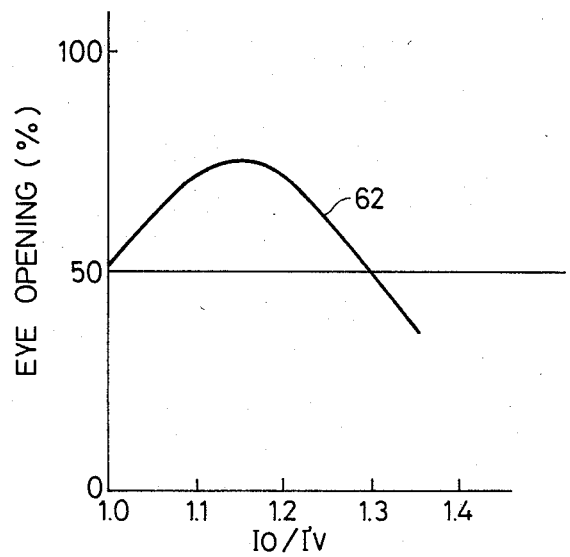

FIGS. 16(A) and 16(B) illustrate a recording current waveform (FIG. 16(A)) at the time when the part of the recording current where the amplitude is reduced is made equal to 1 bit period, and the effect (FIG. 16(B)) thereof. It is understood that, in this case, the effect of the present invention appears at $1 < Io/Iv' < 1.3$ as indicated by a curve 62 in FIG. 16(B).

Figure 17:
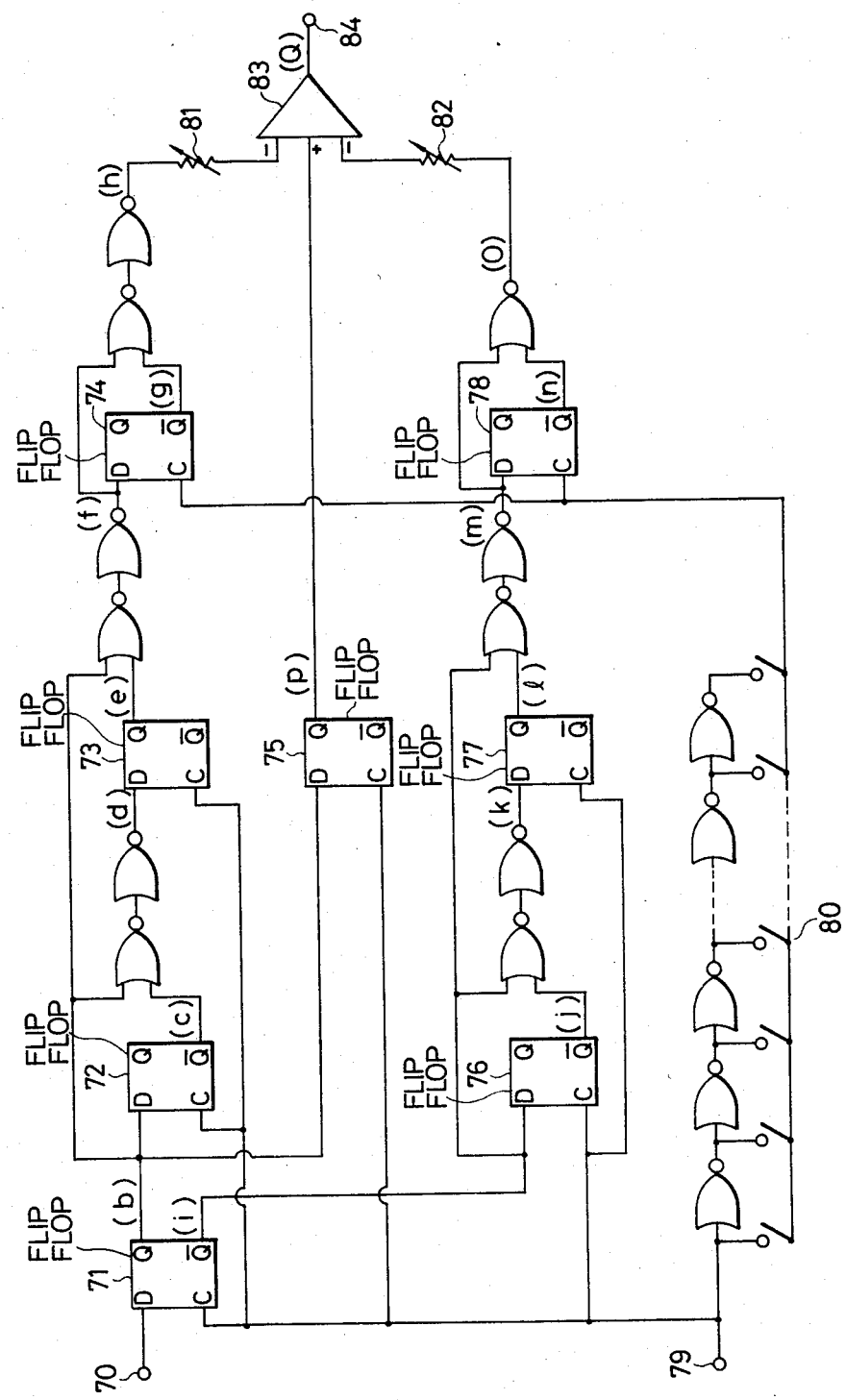
Figure 18:
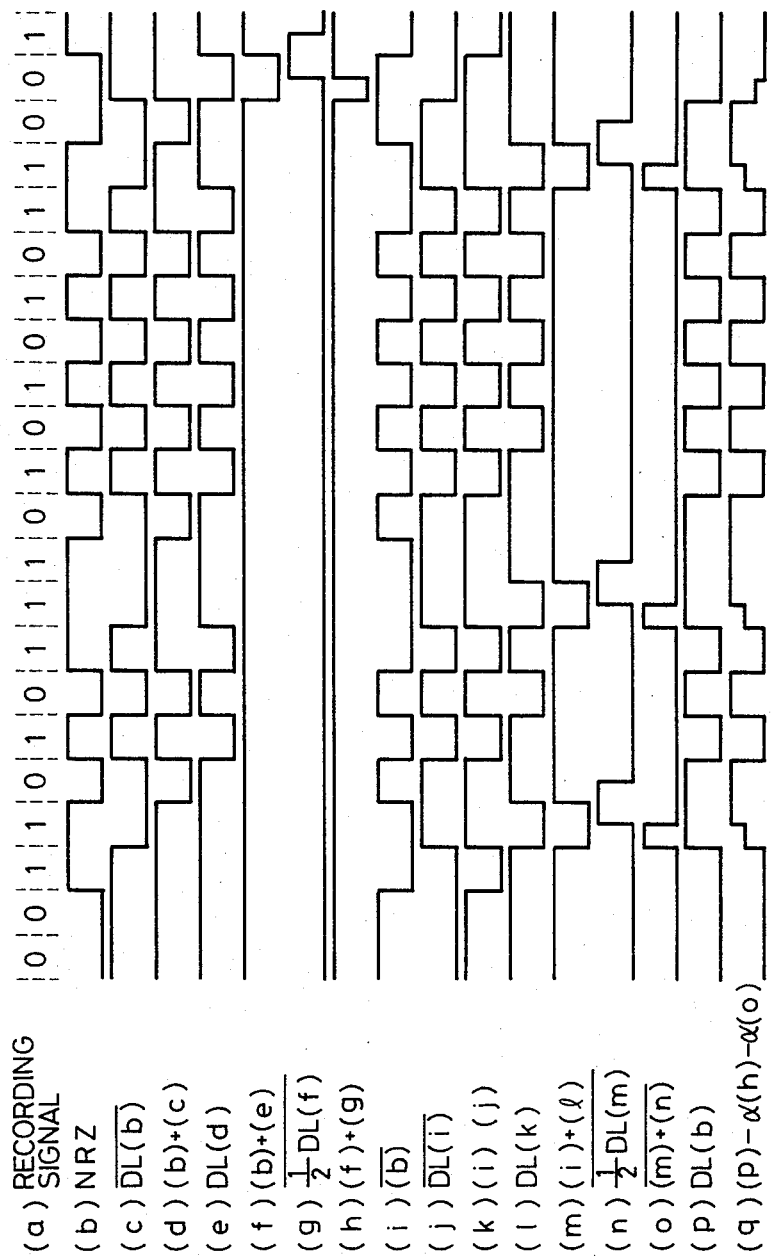

FIG. 17 and FIGS. 18(a)–18(q) show an example in which the present invention is applied to the NRZ recording system, and are a circuit diagram and time charts respectively.

Hereunder, the operating principle of the circuit will be explained by the use of the waveforms of various points in the circuit diagram of FIG. 17, waveforms shown by the time charts of FIGS. 18(a)–18(q), and the Boolean algebra.

First, let's consider to detect a bit pattern of "100" or "011" in a signal given in time sequence.

Now, when only the bit pattern of "100" is handled, it is caused to correspond to a code of $x_1 = (100)$, and signals with the code delayed by 1 time and 2 times of the bit period are denoted by $x_2$ and $x_3$. In that case, $x_1$, $x_2$ and $x_3$ are arrayed as follows:

$$x_1 = 1\ 0\ 0$$
$$x_2 = \phantom{1\ }1\ 0\ 0$$
$$x_3 = \phantom{1\ 0\ }1\ 0\ 0$$

Accordingly, the code $x_4$ of $x_1 \cdot \bar{x}_2 \cdot \bar{x}_3$ becomes:

$$x_4 = 0\ 0\ 1\ 0\ 0$$

This code $x_4$ forms the code of (00100) for only the code of $x_1$ being (100). It is used for detecting (100) and controlling the current reversal amplitude of the recording current. As regards the code of (011), the inverted form of this code becomes $x_1 = (100)$, and hence, $x_4$ is similarly obtained by employing a signal with the polarity of the original signal reversed. $x_4$ is:

$$x_4 = \bar{x}_1 \cdot x_2 \cdot x_3 = \overline{x_1 + \bar{x}_2 + \bar{x}_3}$$

Accordingly, the code $x_4$ and the corresponding current can be realized by the use of flip-flops and OR gate circuits.

FIG. 17 is the diagram of the circuit which realizes the present invention on the basis of the idea described above. FIGS. 18(a)–18(q) are the charts illustrative of current waveforms corresponding to various points in the circuit diagram of FIG. 17 when the recording information of FIG. 18(a) are taken as an example.

Description will now be made along the flow of signals.

Numeral 70 in FIG. 17 indicates a data input terminal, to which the recording current of the NRZ recording system is applied. Numeral 79 in the figure indicates an input terminal of a clock signal for operating flip-flops. Data is applied to a flip-flop 71 in the figure, to obtain outputs (b) and (i). The driving currents (b) and (i) correspond to FIGS. 18(b) and 18(i) respectively. The signal (b) enters a flip-flop 72 in FIG. 17, the output (c) of which is a signal in FIG. 18(c) and is a signal delayed by 1 bit and having the opposite polarity with respect to the signal (b). Supposing the signal (b) to be $x_1$, the signal (c) becomes $x_2$. A signal (d) obtained by passing the signals (c) and (b) through OR circuits is shown in FIG. 18(d), and is a code of $\bar{x}_2 + x_1$. When the signal (d) is applied to a flip-flop 73 in FIG. 17, a signal in FIG. 18(e) is obtained. This code is a signal with $\bar{x}_2 + x_1$ delayed, and becomes $\bar{x}_3 + x_2$. By passing the signals (e) and (b) through OR circuits in FIG. 17, a signal in FIG. 18(f) is obtained. The code (f) is $x_1 + x_2 + \bar{x}_3$, which becomes the code $x_4$. Accordingly, the code (f) becomes a signal which has the polarity of a low level in only the second "0" bit of the code "100" in FIG. 18(a). By passing the signal (f) through a flip-flop 74 in FIG. 17, a signal (g) is obtained. Here, when the clock of the flip-flop is delayed by only half of the bit period by means of a switch 80 in the figure, the signal (g) becomes such that the signal (f) is delayed by the half bit period and has its polarity reversed. A signal in FIG. 18(h) is obtained by passing the signals (g) and (f) through OR circuits. A signal (p) is obtained by passing the original signal (b) through a flip-flop 75 in FIG. 17. When comparing FIGS. 18(h) and 18(p), the signal (h) corresponds to the initial current amplitude reversal point in a case where the polarity of the low level continues for at least 2 times of the bit period. Likewise, in order to find the initial current amplitude reversal point in the case where a high level continues for at least two times of the bit period, the signal (i) in FIG. 17 with the polarity of the recording current of the original NRZ system reversed is passed through a circuit 76 to 78 of the same arrangement as that 72 to 74, thereby to obtain a signal (o).

The signal (h) and the signal (o) are attenuated a $\alpha$ times by an attenuator 81 and an attenuator 82, respectively. When the resulting signals are applied to a differential amplifier, indicated at numeral 83, along with the signal (p), a signal in FIG. 18(q) is obtained. This is the recording current waveform of the present invention, and is taken out from an output terminal 84.

In the present embodiment, there has been exemplified the case where the part of the recording current in which the amplitude is reduced is the half bit period. However, the aforementioned part can be made another period, such as 1 bit period, by properly adjusting the delay time of the clock pulse to be impressed on the flip-flops 74 and 78.

The present invention thus far described in detail can make the amplitudes of playback pulse signals constant irrespective of recording patterns, and in turn, can reduce symbol errors in the playback operation, so that it is very effective as a magnetic recording and playback method for digital information such as in high density video recording of video tape recorders, etc.

We claim:

1. In a magnetic recording method for digital signals having a predetermined bit period wherein magnetic patterns corresponding to the digital signals are recorded on a magnetic medium;

the steps comprising detecting from said digital signals a recording current of an identical polarity which continues for a time at least equal to 1.5 times said bit period of the digital signals, and setting a current reversal amplitude Iv of a current reversal point at which the recording current of said identical polarity is started at a smaller level that the current reversal amplitude Io of the current reversal points from which the recording current will continue with identical polarity for less than 1.5 times the bit period of the digital signals, and wherein said smaller level of the current reversal amplitude Iv continues for a predetermined period of time.

2. A magnetic recording method for digital signals as defined in claim 1, characterized in that said smaller level of the current reversal amplitude Iv continues for 0.5–1.0 bit period.

3. A magnetic recording method for digital signals as defined in claim 1, characterized in that said current reversal amplitude Iv and said current reversal amplitude Io satisfy the relation $1 < Io/Iv < 1.4$.

4. A magnetic recording system for digital signal having a predetermined bit period wherein magnetic patterns corresponding to said digital signals are recorded on a magnetic medium, said system comprising means for detecting from said digital signals a recording current of an identical polarity which continues for a time at least equal to 1.5 times said bit period of said digital signals, and means for setting for a predetermined period of time a current reversal amplitude Iv of a current reversal point at which the recording current of said identical polarity is started at a smaller level than the current reversal amplitude Io of the current reversal points from which the recording current will continue with identical polarity for less than 1.5 times the bit period of the digital signals.

5. A magnetic recording system as defined in claim 4, wherein said setting means includes means for continuing said smaller level of the current reversal amplitude Iv for 0.5–1.0 bit period.

6. A magnetic recording system as defined in claim 4, wherein said current reversal amplitude Iv and said current reversal amplitude Io satisfy the relation $1 < Io/Iv < 1.4$.

* * * * *